US 8,706,647 B2

(12) United States Patent
Pathak et al.

(10) Patent No.: US 8,706,647 B2
(45) Date of Patent: Apr. 22, 2014

(54) ESTIMATING VALUE OF USER'S SOCIAL INFLUENCE ON OTHER USERS OF COMPUTER NETWORK SYSTEM

(75) Inventors: Nishith Pathak, Minneapolis, MN (US); Senthilkumar Krishnamoorthy, Minneapolis, MN (US); Jaideep Srivastava, Plymouth, MN (US); Dmitri Williams, Redondo Beach, CA (US)

(73) Assignees: University of Southern California, Los Angeles, CA (US); Regents of the University of Minnesota, Minneapolis, MN (US)

( * ) Notice: Subject to any disclaimer, the term of this patent is extended or adjusted under 35 U.S.C. 154(b) by 261 days.

(21) Appl. No.: 13/243,624

(22) Filed: Sep. 23, 2011

(65) Prior Publication Data
US 2012/0158455 A1 Jun. 21, 2012

Related U.S. Application Data

(60) Provisional application No. 61/508,505, filed on Jul. 15, 2011, provisional application No. 61/424,278, filed on Dec. 17, 2010.

(51) Int. Cl.
*G06Q 99/00* (2006.01)
*G06Q 30/00* (2012.01)
(52) U.S. Cl.
USPC .......................................... 705/319; 705/7.29
(58) Field of Classification Search
None
See application file for complete search history.

(56) References Cited

U.S. PATENT DOCUMENTS

| 7,653,568 | B2 | 1/2010 | Keller et al. |
| 7,933,843 | B1 | 4/2011 | Von Groll et al. |
| 7,941,339 | B2 | 5/2011 | Argais |
| 2008/0162260 | A1* | 7/2008 | Rohan et al. ................. 705/10 |
| 2009/0265430 | A1 | 10/2009 | Bechtel et al. |
| 2009/0281851 | A1 | 11/2009 | Newton et al. |
| 2009/0307073 | A1* | 12/2009 | MirrokniBanadaki et al. ........................ 705/14.25 |
| 2010/0145777 | A1* | 6/2010 | Ghosh et al. ................ 705/14.1 |
| 2010/0228614 | A1* | 9/2010 | Zhang et al. .............. 705/14.16 |
| 2011/0106829 | A1* | 5/2011 | Pradhan et al. .............. 707/765 |
| 2011/0184792 | A1* | 7/2011 | Butcher et al. ............ 705/14.13 |
| 2012/0215597 | A1* | 8/2012 | Ross ........................... 705/14.1 |

OTHER PUBLICATIONS

Shetty, Jitesh, and Jafar Adibi. "Discovering important nodes through graph entropy the case of enron email database." Proceedings of the 3rd international workshop on Link discovery. ACM, 2005.*
International Search Report and Written Opinion of the International Searching Authority (ISA/KR), dated Jun. 15, 2012, for PCT Application No. PCT/US2011/062093 (published Jun. 21, 2012 as WO 2012/082339 A2), entitled "Estimating Value of User's Social Influence on Other Users of Computer Network System."

(Continued)

*Primary Examiner* — Jonathan Ouellette
*Assistant Examiner* — Maame Ofori-Awuah
(74) *Attorney, Agent, or Firm* — SoCal IP Law Group LLP; Steven C. Sereboff; Jonathan Pearce (57) ABSTRACT

The social influence that each person in a computer network system exercises over others in the system may be valued by aggregating the differences in value of each of the others to the network both with and without the person being present. This calculated influence may be used as a basis for charging advertisers for advertisements to the users, as well as for providing preferential treatment to users that exert the greatest influence.

19 Claims, 7 Drawing Sheets

(56) References Cited

OTHER PUBLICATIONS

Domingos, P. et al. 2001. Mining the network value of customers. In Proceedings of the Seventh ACM SIGKDD international Conference on Knowledge Discovery and Data Mining (San Francisco, California, Aug. 26-29, 2001). KDD '01. ACM, New York, NY, 57-66.

Dye, R. 2000. The Buzz on Buzz, Harvard Business Review, Nov.-Dec. 2000, Reprint No. R00606.
Kempe, D. et al. 2003. Maximizing the spread of influence through a social network. In Proceedings of the Ninth ACM SIGKDD international Conference on Knowledge Discovery and Data Mining (Washington, D.C., Aug. 24-27, 2003). KDD '03. ACM, New York, NY, 137-146.

* cited by examiner

ESTIMATING VALUE OF USER'S SOCIAL INFLUENCE ON OTHER USERS OF COMPUTER NETWORK SYSTEM

CROSS-REFERENCE TO RELATED APPLICATIONS

This application is based upon and claims priority to U.S. provisional patent applications 61/508,505, entitled "ESTIMATING THE LIFETIME VALUE OF PARTICIPANTS, AND OF THE TOTAL NETWORK, IN A SOCIAL SYSTEM, INCLUDING THE PORTION OF VALUE DUE TO SOCIAL INFLUENCE," filed Jul. 15, 2011, and 61/424,278, entitled "METHODS FOR INDIVIDUAL PLAYER AND NETWORK VALUE ESTIMATION IN ONLINE GAMES," filed Dec. 17, 2010. The entire content of each of these applications is incorporated herein by reference.

STATEMENT REGARDING FEDERALLY SPONSORED RESEARCH

This invention was made with government support under Grant. No. IIS-0729505, awarded by the National Science Foundation, and Grant No. ARI W91WAW-08-C-0106, awarded by the Army Research Institute. The government has certain rights in the invention.

BACKGROUND

1. Technical Field

This disclosure relates to computer network systems and to valuation of the influence of one user on other users of the computer network system.

2. Description of Related Art

Some individuals, such as celebrities, are "influential" in that many people see them and get ideas from them. For example, when a celebrity gets a new haircut, her fans may consider getting that same haircut. There can be immense value in understanding how people influence each other. But this value may be difficult to assess.

Ordinary people can also influence others in powerful ways. Friends, enemies, relatives, and co-workers, for example, can influence each other to buy cars, quit smoking, eat certain foods, etc. In any group of people, however, some are likely to be more influential than others. This influence may work on everyone in a group, or on only one or a few members of the group. Again, however, it can be difficult to measure these influences.

People also have network-based connections with other people, such as through on-line video games, email, social networking systems, and the mutual use of content delivery systems, payment portals, and near field communication purchasing systems. People may also influence other in connection with these network-based connections. Knowing the value of each person's influence could be immensely valuable. For example, it could enable preferential treatment of those users whose influence brings significant value to the network. But, again, it can be difficult to value these connections and predict the types of influence they may have.

SUMMARY

A computer system may detect the level of influence of one person on others across an entire network of people. It may compute a value for the influence each person exercises over the other persons. It may do so based on their interactions with the others, their activities, the activities of the others, and the timing of each. The end result may be a value for each person's influence both on others and across the whole network system. A numerical value may be computed for each person and then listed in a table of all users of a system.

With knowledge of these values, a marketer, community organizer, advertiser, or anyone else interested in people in a social system, may know differences among people, i.e. who is influential, in what situations, and how much that influence is worth. This may allow them to treat and interact with these people to improve the system, to create more value, to increase participation, and/or to further other social outcomes.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

The Concept of "Social Influence Value"

People influence each other, and this may be measured. The total commercial value of an individual may be their own value (call this "A," lifetime value, or LTV), plus the value they create by influencing others (call this "B"). Their total value may thus be the sum of these two values (A+B=C).

The actions of every participant can have a positive or negative impact on others in their local network or "neighborhood." Thus, not only may a user be interacting with a system, but the user may also be impacting (and being impacted by) the participation of others. Below is an example of how this influence may be measured. It includes calculating a value to the system both with and without this one user. This helps capture that user's net social influence on the system. Examples of the kinds of data that may be analyzed are also set forth.

The "social influence value" of a user may be monetary or any other outcome of interest. Examples include the amount of time a user spends in a system, satisfaction, response rate to advertisements served to the user, money spent, etc. "Value" is a generic concept and means an outcome of interest. These outcomes can be measured in a variety of ways.

One way is to measure the time a user spends in a system. This may come from a self-report via a survey instrument or from "server-side" data, i.e. records of when the user entered and exited (or "logged in" and "logged out"). By stitching together these sessions, time spent may be directly measured.

Another way is to look at the response rate to advertisements. This refers to a user seeing an advertisement and then activating an included link to a purchasing site or process. For example, a web-based ad may contain a hyperlink to a shopping portal. When that link is activated, software records the action. Software may also track that user's activity on the shopping portal to determine whether the person simply looked, or actually purchased. If a purchase is made, the advertisement may be directly shown to have been effective and rates of spending can then be associated with the ad.

Another way is to look at satisfaction. This refers to any of several measures of mood or happiness with a given site or service. This may be measured via a survey with Likert-scale questions such as "How pleased are you with [name of service]?" with responses ranging from very satisfied to very unsatisfied. These may be 5- or 7-point answer ranges with a hidden number code representing each answer category. Satisfaction may also be measured with the proxy of time spent or a continued subscription to a site or service.

Another way is to look at money spent. Spending within a system may be logged and may then be associated with a unique account identifier. Cumulative totals, rates of spending, and account history may all provide outcome measures.

Technical Details

Illustrating a Local Network with Total Individual Values

Figure 1:
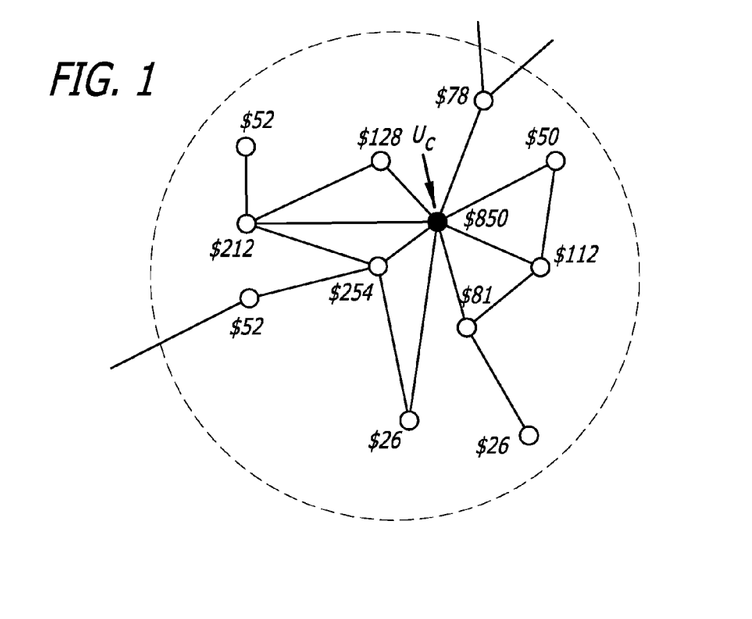
FIG. 1 illustrates an example of valuations of influence that users exercise over others.

FIG. 1 illustrates an example of valuations of influence that users exercise on others. FIG. 1 illustrates a "local neighborhood" in some network of users along with their corresponding values. User $u_c$, for example, has an unusually large value associated with him/herself. This is because, not only is user $u_c$ providing direct revenue, but also influencing his/her neighbors. This influence can be a large part of the value of a user's presence. User $u_c$+s influence on others in the network is included in his/her valuation. As a result, the actual value of user $u_c$ may be a lot more than indicated by the direct revenue generated from him/her. Influence value estimation captures and quantifies this effect for each user in the network.

One challenge may arise from the extent of activities in which users can participate. For example, in MMO games, users may undertake quests (solo and as a group), farm items such as gold, kill monsters and/or other user avatars, form and/or join guilds, mentor other users, trade, chat, etc. Many of these activities may influence, directly or indirectly, the actions of other users in a variety of ways that are dictated by the nature of the environment, users, and the activities themselves. Activities performed by various users, directly or indirectly, may impact the revenue generated from the system.

Using Connection and Outcome Data

A set of users may participate in various activities. Data on each user as well as his/her actions may be available in user logs. Profile information on each user, if available, may also be included. Data on the environment itself may also be available.

For a given action, a first step may be to construct a data mining prediction model. The activity, profile, and environment data may be given as input to a data mining model which learns a mathematical and/or logical formula that predicts the probability of users participating in a given action. In order to measure the influence of a given user A on another user B, for example, the probability of user B participating in an activity may be computed. This probability may then be combined with a revenue value, associated with user B performing the activity, to estimate the expected revenue from user B. This expected revenue may also be referred to as the intrinsic value of user B. The removal of user A may then be simulated by removing all data related to the user A and re-computing the expected revenue from user B performing the same activity. The difference between the expected revenues from user B, for a given activity, with user A being both present in and absent from the data, may be taken as the measure of user A's influence on user B, for that activity. The same computation may be made for other types of activity in which user A may influence user B. User A's influence on every other user may similarly be estimated. The valuations of all of this influence may then be aggregated to obtain a value of influence for user A. Thus, a measure may be provided of how much user A's presence, reflected in the data, impact the activities and consequently the revenue generated from other users.

Figure 2:
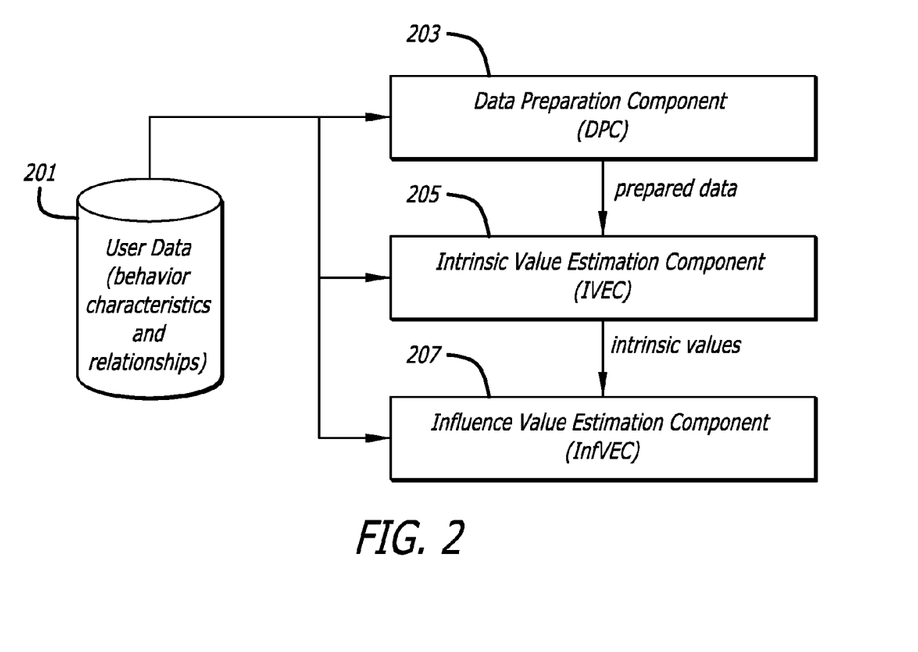
FIG. 2 illustrates an example of a computer valuation system that estimates the value of users and their influence on others based on data that is indicative of relationships between the users, actions that they have taken, and their characteristics.
Figure 3:
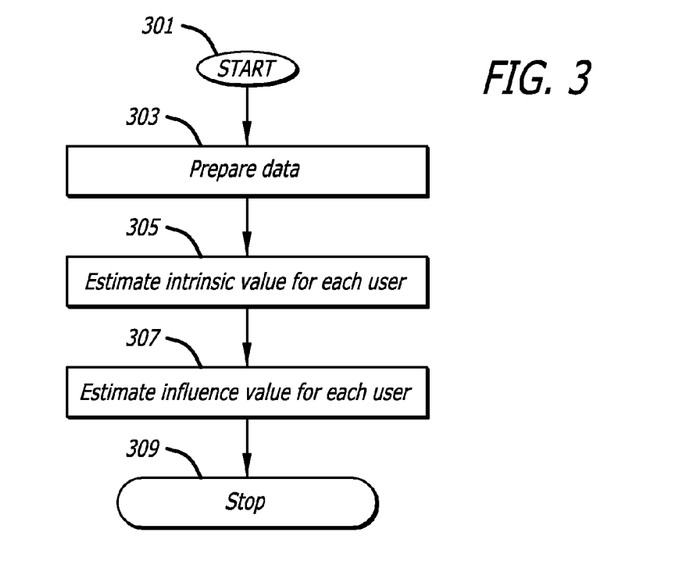
FIG. 3 illustrates an example of a process that the computer valuation system in FIG. 2 may implement.

FIG. 2 illustrates an example of a computer valuation system that estimates the value of users and their influence on others based on user data 201 that is indicative of relationships between the users, actions that they have taken, and user characteristics. FIG. 3 illustrates an example of a process that the computer valuation system in FIG. 2 may implement.

The process may begin, as illustrated by a Start step 301. A data preparation component (DPC) 201 may be configured to prepare the data, as reflected by a Prepare Data step 303. An intrinsic value estimation component (IVEC) 205 may be configured to estimate the intrinsic value of each user, as reflected by an Estimate Intrinsic Value for Each User step 305. The intrinsic value of the user may be a measure of a user's commercial value to the online environment. An influence value estimation component (InfVEC) 207 may be configured to estimate the influence value of each user, as reflected by an Estimate Influence Value for Each User step 307. Each of the components 201, 203, 205, and 207 may be configured to perform these functions in accordance with one of the ways that are described in this application.

Data Retrieval

The user data 201 on users' activities in the online environment may be available in a database or another form. Users' activities may include any actions that are observed and logged. User profile data may include any data associated with the users' representations in the environment (examples include characteristics of the users' avatars such as their gender, dress-up preferences, look preferences, race, etc), as well as the users' real life profile (examples include variables such as age, sex, marital status, address, etc).

Data on users' relationships and/or interactions with each other can be extracted from activity logs using standard log parsing procedures. Their relationships between each other may be constructed as network(s) built through friendship, communication, interactions, or joint activity data. These relationships may be detected by consolidating data involving users' interactions with each other via system specific features such as "friend lists" or by implication from shared experiences, such as a joint session in a game. Users may be represented as nodes. Edges between nodes may indicate the existence of relationships between pairs of nodes. The edges may each have a numerical value associated with them that quantifies the intensity of these social relationships. These numerical values may be estimated as count, rate or other representative statistics of instances of the underlying social activities, e.g., number/length of messages sent between two people, length and frequency of joint game sessions, etc.

Apart from the three particular data types described above, it is also possible to include any other data specific to the environment that may be helpful, e.g., data in the form of text logs of customers expressing their sentiments on community forums, data regarding billing preferences, etc. Each specific context may require an assessment of the available data and a judgment about which data types (if available) are good indicators of a substantive social connection.

In the case of social networking systems, those data may be friends lists. In an online game, it may be belonging to the same playing group ("guild"). In an email environment, the data may be messages sent from person to person. These various kinds of interactions and connections across systems may be referred to as "relational data," that is, they evidence a meaningful relationship between individuals.

Figure 4:
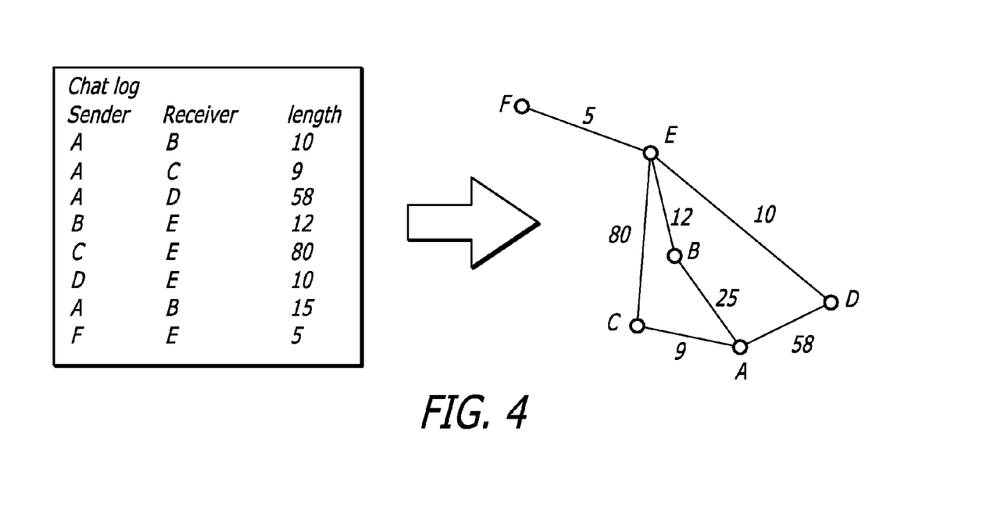
FIG. 4 illustrates an example of network representations being extracted from data that is indicative of relationships between users and actions that they have taken.

FIG. 4 illustrates an example of network representations being extracted from data that is indicative of relationships between users and actions that they have taken. More specifically, FIG. 4 illustrates chat logs and a network based representation of users' chat relationships.

Process Steps to Run Algorithm

Figure 5:
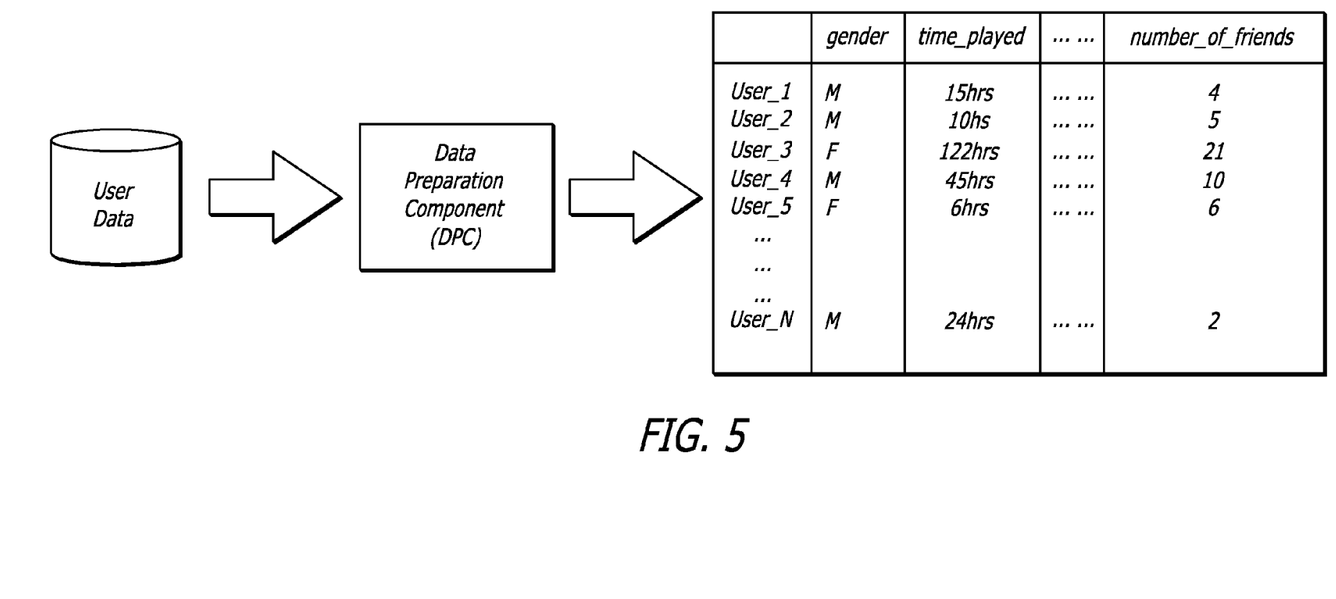
FIG. 5 illustrates an example of information in table form that was extracted by the data preparation component illustrated in FIG. 2 from data that is indicative of relationships between users and actions that they have taken.

The first step may be to prepare the data, as reflected by the Prepare Data step 303. This action may be performed by the data preparation component (DPC) 203 in FIG. 2. The data may be noisy and not directly available in the needed format. The DPC 203 takes the data from the database and processes it using methods, such as de-noisification, dealing with missing values, formatting, and constructing composite data features and/or variables from existing ones. Preparing the data may include formatting it as a record list. Each user may have a corresponding record and each record may consist of a set of variables pulled from the data for that user, in table form. These variables may be a representation of users profiles, relationships, and activities. FIG. 5 illustrates an example of information in table form extracted by the data preparation component illustrated in FIG. 2 from data that is indicative of relationships between users and actions that they have taken.

The DPC 203 may segregate the prepared data into three parts based upon the source from which the prepared data was obtained: (i) user relationship and/or interaction data; (ii) user activity data, as well as any other miscellaneous data, e.g., billing preferences, participation on community forums etc., that is specific to the environment; and (iii) user profile data.

The intrinsic value of each user may then be estimated by the intrinsic value estimation component (IVEC) 205, as reflected by the Estimate Intrinsic Value for Each User step 305. The prepared data may be used for this purpose. The intrinsic value of the user may be the quantification of a user's commercial value to the online environment, independent of the other users. One way of computing this is to estimate the expected revenue from the given user based upon predicting the probability of the user performing a specific action and then combining this with the revenue generated due to the action. The data prepared by the DPC 203 may be used to train data mining models which take as input the output of DPC 203, as well as data on the history of users' activities. For given activities, the models may identify mathematical and/or logical formulations that allow estimating the probabilities of users participating in that activity. These probabilities may then be used to estimate the expected revenue from each user. The intrinsic value estimation component (IVEC) 205 in FIG. 2 may be responsible for this function of constructing the data mining models and using them to estimate expected revenue from each user for a given set of activities.

The network influence value of each user may then be estimated by the influence value estimation component (InfVEC) 207, as reflected by the Estimate Influence Value for Each User step 307. The influence value of a user may be the expected revenue from others due to the impact of that user's presence on other users' activities. Estimation of a given user's influence value may be done by simulating his/her removal from the environment. The models trained during the IVEC may be used for this purpose. The removal of given user A may be simulated by re-computing the expected revenue from each user after modifying their DPC generated data such that all data involving user A is removed. For example, if five users have spent 20% of their session time with user A then this 20% session time and anything pertaining to it, for each of those five users, may be excluded from the modified data set. The influence value of user A over another user B may be taken as the difference between the two expected revenues, from user B performing some given activity, when user A is present and when user A absent from the data, respectively. The influence value for user A is then taken to be the sum of changes in expected revenue for all other users when user A is removed from the data.

Mathematical Version of Algorithm

This method of computing influence value can be summarized by the following equation:

$$\text{InfluenceValue}(U,A,G) = \Sigma_{uj \text{ in } V-\{U\}} [\{Pr(u_j,A|G) - Pr(u_j,A|G_{\{-U\}})\} * \text{value}(u_j,A)]$$

Influence value, for a given user U in network G participating in activity A, is the change in the probability, of participating in A, for the rest of the users when U is removed from the network. In the above equation, Pr(uj,A|G) and Pr(uj,A|G{−U}) are the probabilities of user uj performing action A given user U is present and absent from the data respectively, V−{U} is the set of all users except for U and value (uj, A) is the revenue from user uj performing activity A.

In the case where users can perform multiple activities (say A1, . . . , Ak), the influence value of users for each of these activities can be computed and aggregated to obtain an overall influence value for each user. One way of doing so is to simply add the influence value from each action:

$$\text{InfluenceValue}(U,\{A1,\ldots Ak\},G) = \Box_{i=1\ldots k} \text{InfluenceValue}(U,A_i,G)$$

The individual influence values may be combined into an overall influence value in other ways instead.

Similarly, in case of multiple relationships, aggregations over influence value from each one may also be computed and aggregated"

$$\text{InfluenceValue}(U,\{A_1,\ldots,A_k\},\{G_1,\ldots,G_r\}) = \Sigma_{i=1\ldots r} \text{InfluenceValue}(U,\{A_1,\ldots,A_k\},G_i)$$

Presentation of Results

The estimated influence values can be presented with a table, or via a graphical user interface which could present the network along with the influence value for each user on the corresponding nodes.

Figure 6:
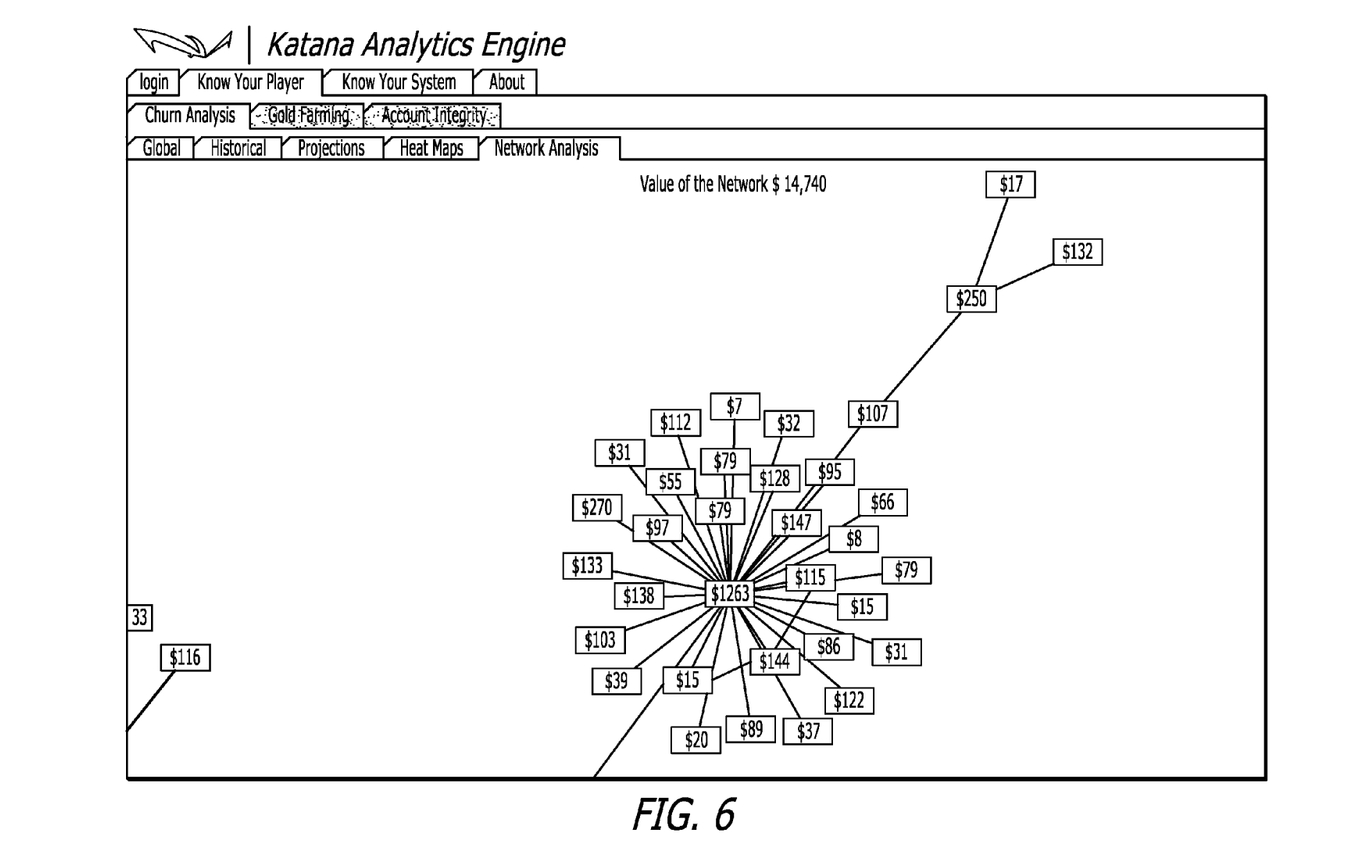
FIG. 6 is an example of a graphic presentation of estimated influence values for users from data that is indicative of relationships between users and actions that they have taken.

FIG. 6 is an example of a graphic presentation of estimated influence values for users from data that is indicative of relationships between users and actions that they have taken. Estimated influence values are displayed as node labels along with a visual representation of the network of users.

Extensions of Algorithm

Influence value is not just limited to influence in a single network. It can be extended to multiple networks which themselves can contain multiple nodes, as well as edge types. Instead of scalar values, edges may have a vector valued weight representing multi-faceted relationships. Another extension is when samples of the same set of relationships are expressed as corresponding samples of networks at multiple time instances. This may induce a dynamic longitudinal component to the relationships and a temporal component to influence value, versus the cross sectional case where networks at a single time instance or an aggregation over multiple times instances are considered. Using the data available, influence value may be estimated descriptively for the current time instance and/or predicted for future time instances. In the former case, the estimated influence value may be an indication of customers' values at the point in time at which it is computed. In the latter case, where it is predicted, the estimated influence value may indicate users' values expected at a certain finite or unbounded number of time instances in the future.

The heterogeneity in the network structure, cross-sectional and longitudinal analysis, as well as the predictive versus descriptive computations, can be seen as independent factors. Different permutations across these factors may give rise to the different cases in which influence value can be estimated.

Figure 7:
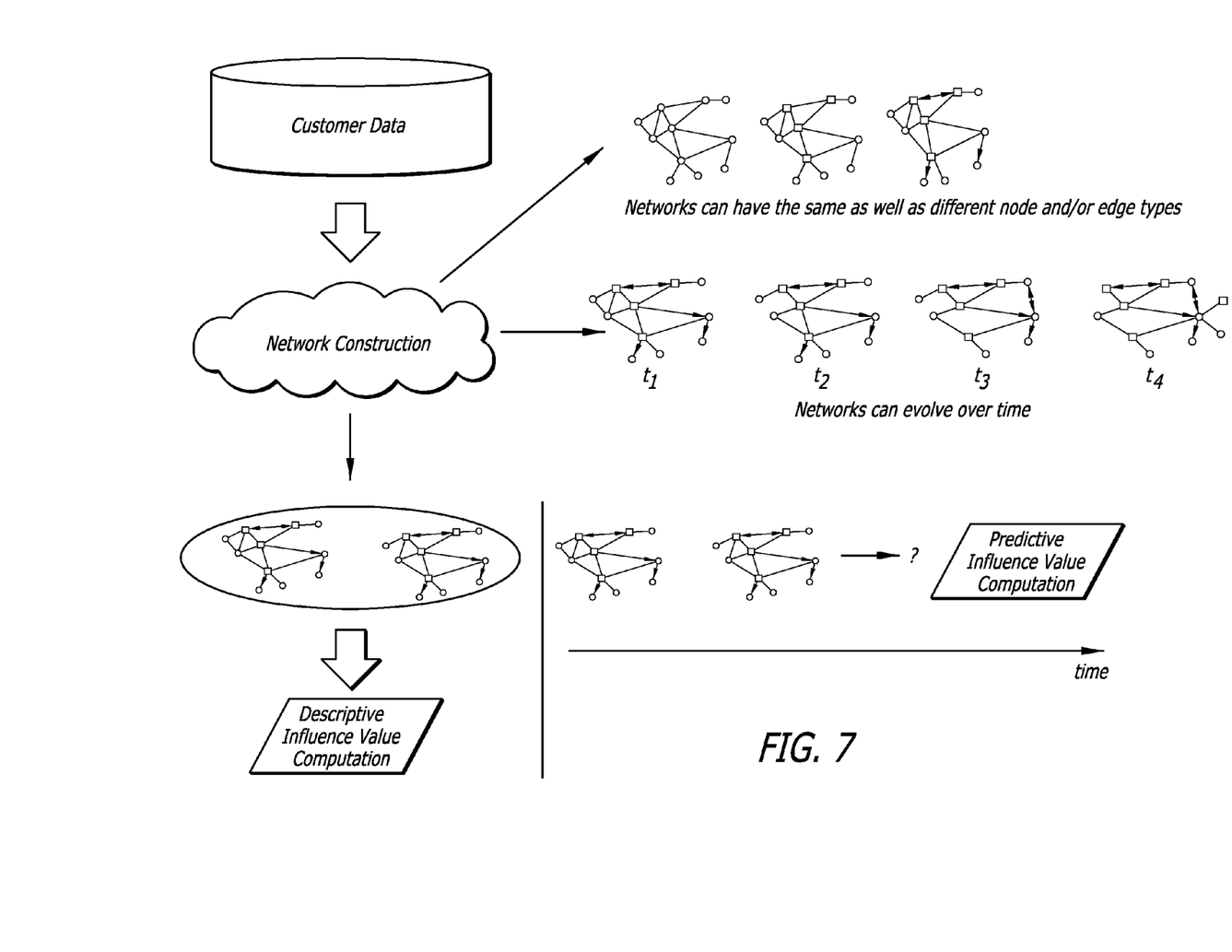
FIGS. 7 and 8 illustrate examples of different scenarios that can arise in influence value computations.
Figure 8:
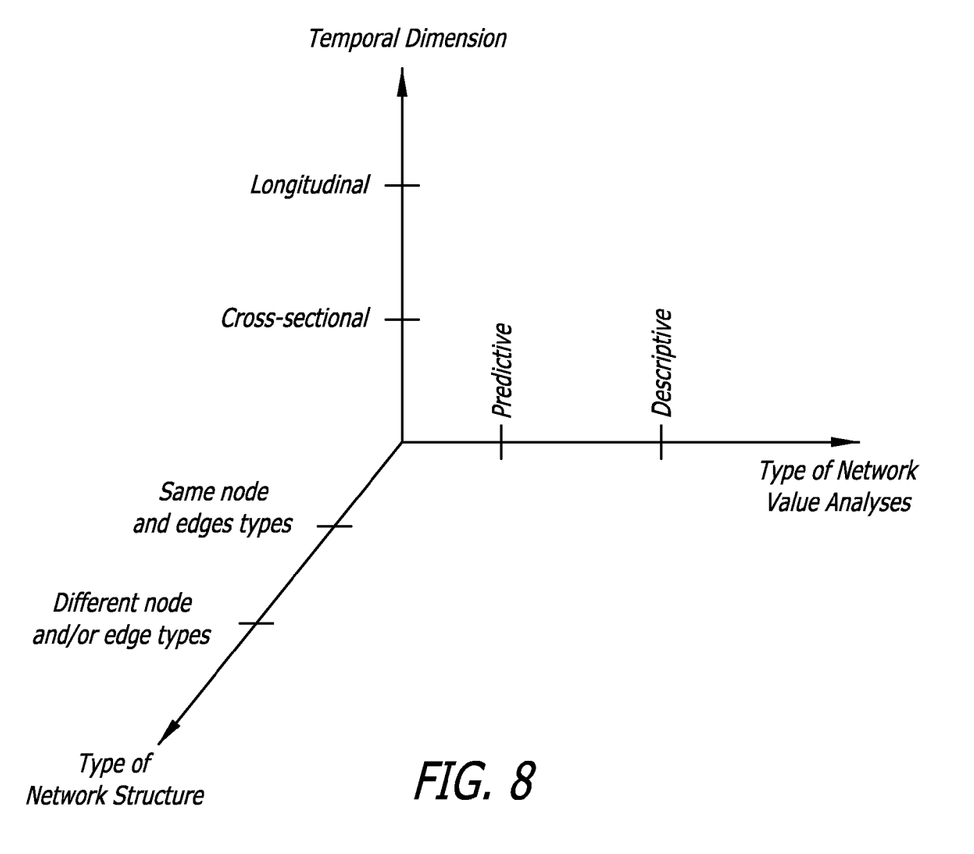

FIGS. 7 and 8 illustrate these cases across the different factors. The different cases presented cover many situations in which influence value can be estimated. In FIG. 7, influence value can be estimated for a variety of cases depending on the nature of the networks and analysis. FIG. 8 illustrates the independent factors viz. nature of the network structure, temporal dimension, and the analysis. Combinations of the variations along these factors result in different cases in which influence value can be estimated.

Applications for Social Influence Value Algorithm

Social influence may be computed in connection with information processing in social systems. These systems may be anything involving people connected to each other via social networks or relationships, whether formalized through a system, e.g. "friends lists," or by implication from shared experiences, e.g. two people sending each other messages, or having a shared experience such as in a joint session of a game.

Uses of Results

In a commercial setting, knowledge of this social influence value may be used in several ways. For example, identifying influential users ("customers") may help the operator of the social system ("company") understand their relative value. A company that understands that ties between its customers are important can provide preferential treatment for its influential customers—for example, faster or better customer service. That influential customer could also be used as a "seed" for a promotion, e.g. give the person a discount or a free item with the knowledge that that person's close social neighbors are likely to desire the item and then pay for it, thus recouping any cost or opportunity cost. Knowledge of the tie between the people could be used to create a promotion that benefits both people, e.g. a discount or unlocking of content for both, when both buy or try a product or service. Using the algorithm, a company may essentially "piggyback" on an existing relationship where one person influences another (or several) and vice versa. For some businesses, such as online social games, it may be desirable to have users influencing each other, as this may be an indication of a healthy community which can attract more customers as the community grows. For such businesses, the algorithm can be used to study whether the game system is resulting in the desired social influence effects and developers can make necessary adjustments to improve their customers' experiences. The social influence value may therefore be doubly useful as a way of testing modifications to the system.

Source Data that May Enable Applications

The source of the data may be based on records of substantive human connections. These may be connections that occur outside a purely commercial context, e.g., in a more "organic process." The data focus may be on friendships and joint activities, and the commercial outcomes may be the outcomes, not the inputs.

As detailed in the examples below, a wide range of data may be used that measure socially substantive connections between people. These connections (paired with the outcome of interest, e.g. spending) may be the source data that is used in the calculations of the algorithm.

Including Time as a Factor

Time may also be accounted for. Time-stamped values may reveal what event occurred before what other event. It may be crucial to recognize the causal order of the influence process, e.g. two people may need to become linked first before the influence can be said to take place; one person may needs to buy something before they influence the other to buy it.

Examples of Social Influence Value Calculations in Various Industries

The following examples illustrate socially substantive data and time-based records in action. They focus on how to measure the social influence value (B).

Custom versions of the algorithm may be created for categories. The simplest use of the algorithm may be that, when the first user buys, others then buy. A more specific case would be that, when the first person buys something in a category, e.g. clothing, others then buy clothing. A more specific case would be, if the first person were to buy jeans, then others buy jeans. A still more specific case would be, if the first person bought a particular style and cut of jeans, and then others bought that same type.

Online Video Game Playing

In online video game playing, a company (game developer) may sell a service as a subscription and/or via micro-transactions. In the case of subscriptions, the intrinsic value of a user (A or "lifetime value" or "LTV") may be expressed in terms of the number of months the player is expected to play on their own. That, plus their social influence value (B), give their total value (C). The social influence value (B) may be calculated by taking socially substantive connection data from the game world to populate the algorithm. In this case, the data may be the time stamps associated with several kinds of in-game connections. These may be, for example, the creation of "friends" on a friends list, messages sent via the in-game "tell" system, joint participation in groups, quests, clans, guilds or raids, the sending of gifts from one person to the next, and access to or sharing of virtual housing. Each may be a social act, not a commercial one. The algorithm can take one or several of these social interactions, with their timestamps, to show the time-based network created by the players, and to measure how those interactions have impacted how players have bought items, or quit the subscription services, or engaged in any other game-centric activity. For example, two players may spend time with each other in the game and then one of them may buy a virtual horse. The friend then sees the horse, admires it, and then decides to buy it him/herself. The algorithm can capture the creation of the social act of recording the friendship, the first purchase of the horse, then the subsequent purchase by the other person—all timestamped for sequencing.

The categorical variations here may move from the general to the specific as in the jeans buying example above. Here, the most general category may be simply subscribing to a game with a monthly fee, i.e. when one person stays, others then stay. In a purchasing game, the most general category may be pure spending on anything. A more specific case may be when a player spends on weapons and then others spend on weapons. A still more specific case may be if a player bought a particular weapon and then others bought it.

Game companies may take advantage of the resulting social influence value computations by "piggybacking" on the social relationship, i.e. the social relationship exists and the companies can work through it. Moreover, by knowing the value of a relationship, resources can be devoted to marketing intervention. For example, the intervention could be giving the first player—deemed by the algorithm to be the influencer—a free virtual item or free playing time because that may influence their friends to continue playing or to purchase an item themselves. The second player in the example here could represent many potential friends. Moreover, the spreads of social influence could ripple out through a network to friends of friends, although there may be decay after 3-4 links.

Content Delivery Systems

In a content delivery system, such as cable or satellite television, streaming video, or streaming video games, there may be social connections between consumers of content, e.g. two friends may be connected via shows they watch. For example, DirecTV allows its users to post Twitter comments that include a link to the recommended program. Another viewer can read that comment, click the link, and then watch or record that show. This information can be collected and extracted using online user behavior logs and records of shows. The reference may be purely a social act. The necessary components of the data may be the organic social nature of the relationships and the time sequencing of the interactions between the viewers. If such a social pattern happens repeatedly, the first viewer may be classified as influential. As with the game example above, this could result in a ripple effect through networks as the first viewer gets many others to view a show. If those viewers then get others to view the show, the influence of the original viewer may be measured to grow even larger. This cascading effect of social influence can be captured by extending the current embodiment of the invention with a final component. Such an embodiment would first compute the influence values as described above and then use them along with the network as input to a standard influence propagation algorithm, an example of which is the cascading process simulation as described in D. Kempe, J. Kleinberg, É. Tardos, Maximizing the spread of influence through a social network, in *Proceedings of the Ninth ACM SIGKDD International Conference on Knowledge Discovery and Data Mining* (2003), pp. 137-146.] The simulation allows the estimation of probabilities of the influence from any given viewer in the network cascading to other viewers in the network. If a cascade from viewer A can reach viewer B with probability $p_{AB}$, then the value attributed to A due to B can be $p_{AB}$ (InfluenceValue(B)+Intrinsic Value(B)). Such values are then aggregated. One way to do this is via summation, over all viewers in the network that A can reach with a non-zero probability to obtain the required influence measure for viewer A.

This may apply to several variations of viewership and content distribution. If one person watches a pay-per-view movie, for example, his/her friend or influences may be more likely to do the same. Therefore, the system could be used to give the first person a free viewing or discount so that the second person pays regular price. Or, the two people could both be incentivized to buy by being given a shared discount or coupon.

As above, the general to specific variations may be applicable. The general model may detect the pure volume of viewership, while a more categorical application might be for someone who is influential for pay-per-view movies in general. More specific might be pay-per-view action movies, and more specific still might be detection of who influences buying or viewing a particular movie.

This model may apply to streaming video just as readily, since video games are also streaming content. In case of a service such as Netflix, OnLive, or Gaikai, when a player buys a game to play via the system, his/her friends may be determined to be more likely to buy. Here, the social connections may be done via joining a friends list, or sharing a link to the game or content, similar to the Twitter example above. For the company, a marketing intervention could be enabling the second friend to get a discount to join the first player. Alternatively, the first player could be given the discount, knowing that the friend is likely to pay the regular price. Further, the two friends may be provided access to reserved content if both play together. An example might be two friends trying a driving game who, by playing together, get to unlock a car model that others cannot. These viewers may be targets of advertising, and knowledge of their influence values can be helpful for understanding the right advertising rates. The next two examples can be enabled in any industry with advertising.

Payment Portals (e.g., iTunes Store, Amazon, Steam)

Any time a social relationship is detectable in the context of an online payment portal, the tie can be measured for its influence on purchasing decisions. Again, this data may be social and time-sequenced. These interactions could be purchases or only recommendations. For example, iTunes has its Ping service in which users tag songs that are of personal interest. That user's friends can be enabled to see the first one's recommendations, and then may buy them. Here again, sequencing of the social act may be important: In this case, it may be that, when customer A becomes linked to customer B, subsequent actions can be tracked to their connection. If customer A buys a song or rents a movie, and then customer B buys or rents the same song or movie, the algorithm may attribute some of that buying or renting to customer A's influence on customer B. The relationship strength between A and B, as well as a measure of how often B's purchasing behavior follows his/her neighbors in the network, can be used to approximate the probability of B's purchasing decision being influenced by A. Such probabilities can be estimated via Bayesian modeling techniques and can then be used to determine how much of the product's cost must be attributed to A's influence over B. Here again, there may be multiple customer Bs and they in turn could impact others, increasing the influence value of customer A's original action. As described earlier in [0061], the influence measures estimated via the current embodiment can be given as input to an influence propagation algorithm to obtain an influence measure which accounts for this cascading effect. As above, knowing this may give the provider tools to treat the first customer well or to seed them with deals or promotions, knowing that customer B (and others) will likely follow suit. In the shared promotion idea, both friends could be given a discount or improved purchasing power, e.g. two friends renting a movie both get a director's cut with extra scenes when they do it together. This online purchase portal approach can extend to any retail context, including, for example, Amazon, Steam, etc.

If the portal site features advertising, the network influence value can be used to set efficient rates for the sponsors of these ads. The most influential buyers may command higher rates because the advertiser may have an opportunity to influence many others through them. Moreover, the advertiser could be shown the exact amount of resulting influence and purchases made through that network. This level of verifiability may give advertisers more comfort in paying higher rates for more valuable and influential people.

The general to specific categorical model may similarly be applied in a payment portal. The jeans case described above may be an applicable model for a general storefront like Amazon (buying, buying clothing, buying jeans, buying 501 slim fits, etc.) Use in a music context might be influencing spending on iTunes by general volume, then more specific into genre, then more specific into bands, albums and then to individual songs.

Mobile Near-Filed Communication Purchasing

Near-filed communication purchasing may be accomplished by mobile phones whose operating networks generate networking data by default, such as records of phone calls. Mobile communication also fits the social and time-based elements of the algorithm. Phone calls may be social events. Each may also be time-stamped to allow for the sequencing. In the near future (and already in practice in Asia), these data can be tied to purchasing outcomes as well. "Near field communication" or the ability for phones to help make purchases, may represent the outcome data for the model. Purchases may be collected and logged by the mobile operator and associated with a unique account ID of the purchaser. The algorithm then uses these purchases as the outcome of interest. This could be done in the aggregate, by rates of purchasing, by category, or by individual item as explained below. In this example, the tie between people may be evidenced by a phone call. If caller A buys something, then calls caller B, and then caller B buys the same thing, that second purchase may be detected by the algorithm to be partly due to influence by caller A. Again, there may be multiple caller Bs and there can be ripple effects, e.g., caller A influences caller B who influences caller C. A mobile provider can learn which people in its network influence others to buy things in real-world retail situations using the algorithm. As above, this may allow for discounting, incentives, seed promotions, and/or shared deal promotions. This knowledge can also be used by the carrier to set advertising rates more efficiently. One example of this would be pricing higher rates for the more influential people.

The categorical application may fit here again. If the outcome of interest is the social influence value to price phone users with premiums to advertisers, then the type of social influence by retail category may become especially powerful and germane. Someone who is influential in general might command a stronger rate for advertisers, and be worth using for promotions. Someone who is influential for a shopping category would command higher rates and deals from merchants and manufacturers in that sector. Someone who is influential for a particular brand or product could be targeted more precisely. For example, the phone user who is detected to be influential for Levis jeans might command a high rate for Levis, or for a competing company seeking to lure them to their own jeans—and thus to influence their friends to follow suit.

Email-Based Advertising

Email-based advertising may involve placing ads next to email messages, based on the content of the emails, e.g., a person sending a message to a friend about trout fishing may likely see ads about fishing lures or camping equipment. Implementing the algorithm in an environment like this allows for a social component as well. The links in the network may be built by virtue of who sends whom emails, just as in the phone case above it was who calls whom. As users of these email systems buy and spend, the algorithm can track the social influence created. An example is two email users who were connected by virtue of a message between them. This is a social tie being established and, again, with a time stamp for sequencing. If one of those email users then clicks on an ad next to their email about fishing lures, that click is recorded. Then, if that person emails the second person, and then the second person buys the same fishing lures, the algorithm may detect the social influence. Again, there may be several second people, and the influence could ripple out. And again, this knowledge of influence could help set the values for advertising to those particular email users. The algorithm can be used, for example, to find people who are influential in general (across all products), are influential for a particular product (e.g. one kind of fishing lure), or are influential for a class of products (e.g. fishing supplies). So, just as game players or retail purchasers can be measured for their influence on other spending in those environments, the same can be done with click-through advertising in email environments.

The algorithm may use social interactions, not commercial ones. Most emails are not forwardings of deals. They are personal communications, and are thus more social and less commercial. The algorithm also may or may not place value on someone due to their status. A CEO may or may not be inherently more influential than a 3rd grader. Importance may be determined by the actual impact of social influence, not assumed.

Social Networking

Social networking sites such as Facebook may routinely collect networking data. Here, the socially substantive connections may be membership on friend's lists and other interactions via the social platform. For example, posting photos, posting on someone's wall, sending gifts or virtual items or links, etc., may all be considered. Each of these actions may be recorded by the social network system and associated with a unique account ID. Each may also be time-stamped for sequencing. Retail and/or other types of purchasing decisions (or other non-monetary outcomes, if of interest) can be tied to those networks. When Facebook, or any other social network, collects such spending, the social influence can be detected. As above, the requirements may be to know the link between people and then to see a sequence of actions. If Facebook member A becomes "friends" with member B, for example, the link may be detected. Then, if Facebook member A buys a product, and then B does later, the algorithm may detect the influence. This may allow Facebook or other systems to know the relative value of the users in their network, and even to measure the entire influence value for a class of products, or all products, or other kinds of outcomes, e.g. satisfaction, advertising click-throughs, etc. As above, this may allow the networking site operator to price these individuals differently and more efficiently when selling them to advertisers or retailers. For example, if a person in the network is determined to be more influential, the rates to advertise to them can be higher. And as above, when the person is determined to be influential in a particular domain, e.g. clothes purchasing, that person can have especially high rates when advertised to by clothing manufacturers and retailers.

Figure 9:
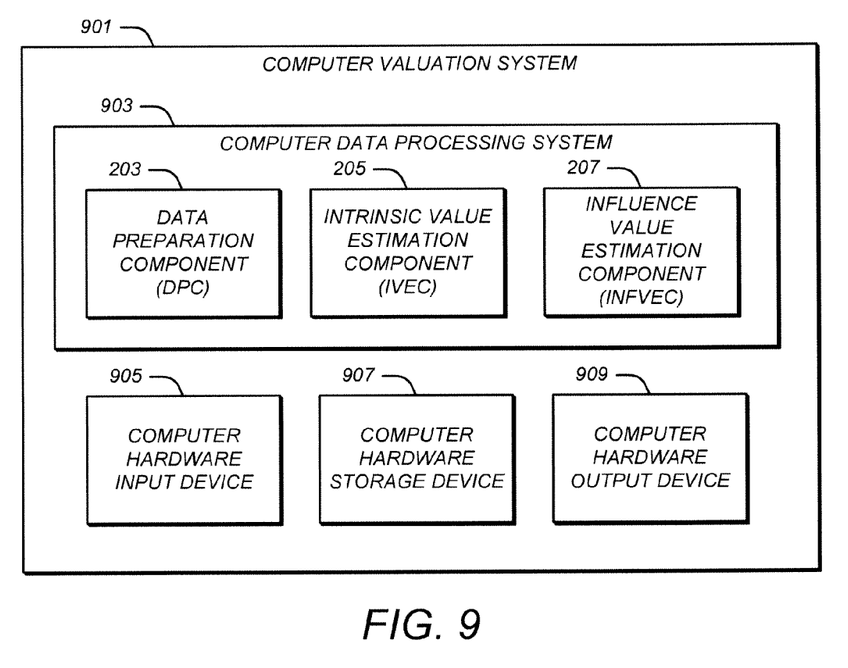
FIG. 9 is an example of a computer valuation system.

FIG. 9 is an example of a computer valuation system 901. As illustrated in FIG. 9, the computer valuation system 901 may include a computer data processing system 403, a computer hardware input device 905, a computer hardware storage device 907, and a computer hardware output device 909.

The computer data processing system 403 may be configured to perform the functions of the data preparation component (DPC) 203, the intrinsic value estimation component (IVEC) 205, and the influence value estimation component (InfVEC) 207, all as explained above. It may include one or more processors and associated support chips, as well as memory and other components. It may also include software configured to perform the functions that are recited herein.

The computer hardware input device 905 may be configured to receive the user data 201 that is used by the computer data processing system 403. The computer hardware input device 905 may be of any type. It may include, for example, a drive configured to read a CD or a DVD containing the user data 201, a network interface configured to receive the user data 201 over a computer network, and/or a keyboard, pointing device, and display configured to receive the user data 201 from a user of the computer valuation system 901.

The computer hardware storage device 907 may be configured to store the user data 201, as well as an operating system and application software that may be needed by the computer data processing system 903 to perform the functions described herein. The computer hardware storage device 907 may be of any type. For example, the computer hardware storage device 907 may include a hard disc drive, a flash memory, and/or any other type of media configured to store computer data.

The computer hardware output device 909 may be configured to output the social influence values computed by the computer data processing system 903. The computer hardware output device 909 may be of any type. For example, it may consist of or include a display, a printer, a drive configured to write a CD or DVD, or a network interface device configured to deliver the social influence values over a computer network.

Except as otherwise indicated, the computer valuation system that has been discussed herein is implemented with a computer system configured to perform the functions that have been described herein for the component. The computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The computer system may be a personal computer, mainframe, workstation, single user system, multi-user system, server, portable computer, hand-held device, cell phone, smartphone, tablet, or part of a larger system, such a vehicle, appliance, and/or telephone system.

The computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein, such as the functions of the data preparation component (DPC) 203, the intrinsic value estimation component (IVEC) 205, and the influence value estimation component (InfVEC) 207. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The terms and expressions used herein have the ordinary meaning accorded to such terms and expressions in their respective areas, except where specific meanings have been set forth. Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

The Abstract is provided to help the reader quickly ascertain the nature of the technical disclosure. It is submitted with the understanding that it will not be used to interpret or limit the scope or meaning of the claims. In addition, various features in the foregoing Detailed Description are grouped together in various embodiments to streamline the disclosure. This method of disclosure is not to be interpreted as requiring that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

The invention claimed is:

1. Non-transitory, tangible, computer-readable storage media containing a program of instructions configured to cause a computer system running the program of instructions to function as a computer valuation system that determines a social influence value for a user of a computer network system by performing the following algorithms:
   using a computer hardware input device to receive:
      relationship information indicative of potentially-influential social relationships between the user and other users; and
      action information indicative of actions taken by the user and other users while using the computer network system;
   using a computer data processing system to calculate the social influence value (SIV) of user (U) of the computer network system (G) for an action (A) identified in the action information, using the equation $SIV(U, A, G) = \Sigma u_{j\ in\ V-\{U\}} [\{Pr(u_j, A|G) - Pr(u_j, A|G_{\{-U\}})\} * value(u_j, A)]$ where:
      $Pr(u_j, A|G)$ is the is the probability of other user $u_j$ performing the action with user U present within a data set,
      $Pr(u_j, A|G_{\{-U\}})$ is the probability of user $u_j$ performing the action with user U absent from the data set,
      $V-\{U\}$ is the set of all other users except for user U, and
      $value(u_j, A)$ is revenue generated for user $u_j$ performing the action; and
   using a computer hardware output device to deliver the social influence value for the user.

2. The media of claim 1 wherein the computer network system is an online video game, a social networking website, an online content delivery system, an online purchasing system, or uses near field communications to effectuate product purchases.

3. The media of claim 1 wherein the relationship information includes information about friendship links that have been established.

4. The media of claim 1 wherein the relationship information includes information about phone calls.

5. The media of claim 1 wherein the relationship information includes information about shared experiences in a virtual world.

6. The media of claim 1 wherein the relationship information includes information about group memberships.

7. The media of claim 1 wherein the relationship information includes the times the relationships were established and the action information includes the times the actions were taken.

8. The media of claim 7 wherein the computer data processing system is configured to determine that a first user exercised social influence over a second user when the relationship information and the action information indicate that the second user made a purchase following the establishment of a relationship with the first user and a purchase by the first user.

9. The media of claim 8 wherein both purchases were of the same type of goods or services.

10. The media of claim 9 wherein both purchases were of the same goods or services.

11. The media of claim 1 wherein the social influence value of the user includes a monetary value of purchases made by the other users that are attributable to the user.

12. The media of claim 1 wherein the social influence value of the user further includes an amount of time that the other users spend in an activity that is attributable to the user.

13. The media of claim 1 wherein the social influence value further includes the value that a first user had on a second user with whom the first user had no relationship, based on a relationship between the second user and a third user with whom the first user had a relationship.

14. The media of claim 1 wherein:
   the computer input device also receives profile data indicative of a profile of each user; and
   the computer data processing system determines the social influence value based also on the profile.

15. Non-transitory, tangible, computer-readable storage media containing a program of instructions configured to cause a computer system running the program of instructions to function as a computer valuation system for determining a social influence value for a user of a computer network system that provides online video game playing, delivers content to users online, facilitates online purchases, is a social networking website, and/or facilitates purchases using near-field communication devices, by:
   using a computer hardware input device to receive:
      relationship information indicative of potentially-influential social relationships between the user and other users of the computer network system; and
      action information indicative of actions taken by the user and other users while using the computer network system; and
   using a computer data processing system to determine the social influence value (SIV) of the user (U) of the computer network system (G) for an action (A) based on the relationship information and the action information, using the equation $SIV(U, A, G) = \Sigma u_{j\ in\ V-\{U\}} [\{Pr(u_j, A|G) - Pr(u_j, A|G_{\{-U\}})\} * value(u_j, A)]$ where:
      $Pr(u_j, A|G)$ is the is the probability of other user $u_j$ performing the action with user U present within a data set,
      $Pr(u_j, A|G_{\{-U\}})$ is the probability of user $u_j$ performing the action with user U absent from the data set,
      $V-\{U\}$ is the set of all other users except for user U, and
      $value(u_j, A)$ is revenue generated for user $u_j$ performing the action; and
   using a computer hardware output device to deliver the social influence values.

16. A process for charging an advertiser for advertisements that are delivered to users of a computer network system comprising:

using a computer data processing system to determine a social influence value for a user of multiple users of the computer network system, the social influence value indicative of how much the user influences purchasing decisions by other users, the social influence value determined using the equation $SIV(U, A, G) = \Sigma u_{j\ in\ V-\{U\}}[\{Pr(u_j, A|G) - Pr(u_j, A|G_{\{-U\}})\} * value\ (u_j, A)]$ where:

$Pr(u_j, A|G)$ is the is the probability of other user $u_j$ performing the action with user U present within a data set,         $Pr(u_j, A|G_{\{-U\}})$ is the probability of user $u_j$ performing the action with user U absent from the data set,         V–{U} is the set of all other users except for user U, and         value $(u_j, A)$ is revenue generated for user $u_j$ performing the action     using the computer data processing system to determine how much to charge the advertiser for advertisements to the user based on the social influence value of the user; and     charging the advertiser the determined charge.

17. A process for managing relations with users of a computer network system comprising:

using a computer data processing system to determine a social influence value for a user of multiple users of the computer network system, the social influence value indicative of how much the user influences purchasing decisions by other users of the computer network system, the social influence value determined using the equation $SIV(U, A, G) = \Sigma u_{j\ in\ V-\{U\}}[\{Pr(u_j, A|G) - Pr(u_j, A|G_{\{-U\}})\} * value\ (u_j, A)]$ where:

$Pr(u_j, A|G)$ is the is the probability of other user $u_j$ performing the action with user U present within a data set,         $Pr(u_j, A|G_{\{-U\}})$ is the probability of user $u_j$ performing the action with user U absent from the data set,         V–{U} is the set of all other users except for user U, and         value $(u_j, A)$ is revenue generated for user $u_j$ performing the action; and     when the social influence value of the user is greater than a predetermined threshold, providing a benefit to the user that is not provided to other users with social influence values less than the predetermined threshold.

18. The process of claim 17 wherein the benefit is a reduced price for one of a product and a service.

19. The process of claim 18 wherein the benefit is complementary access to a service.

\* \* \* \* \*